H. C. HOGLE.
LOCOMOTIVE CAB WINDOW.
APPLICATION FILED JUNE 4, 1918.
1,348,647.
Patented Aug. 3, 1920.
2 SHEETS—SHEET 1.
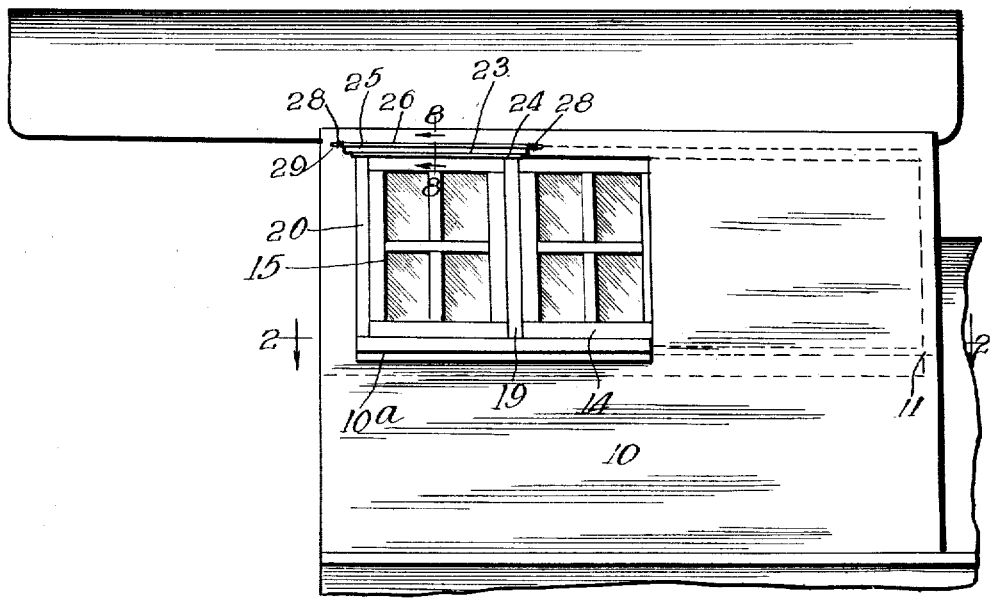
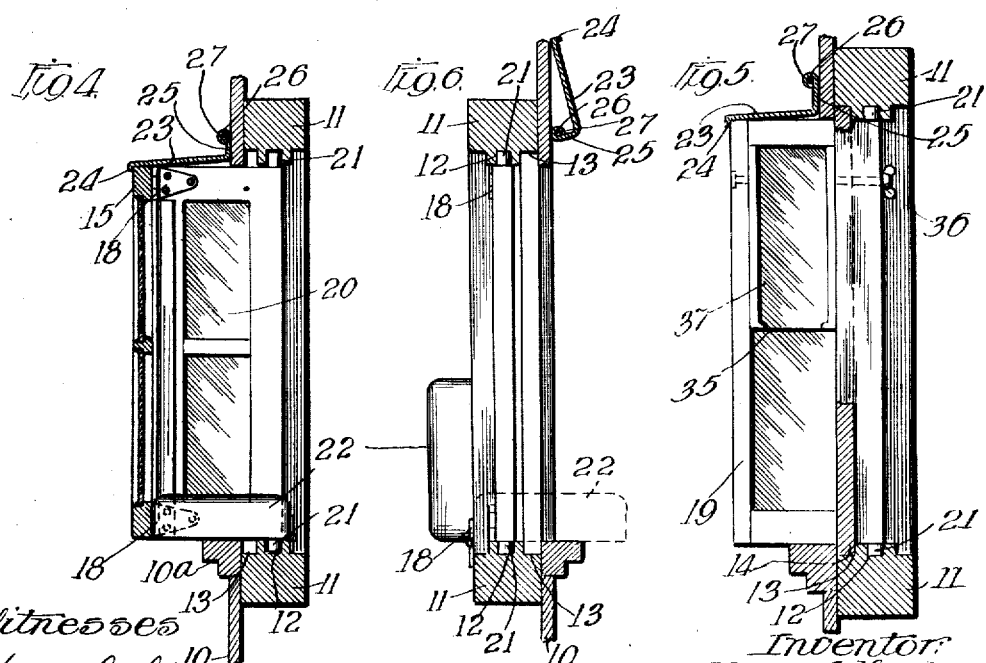

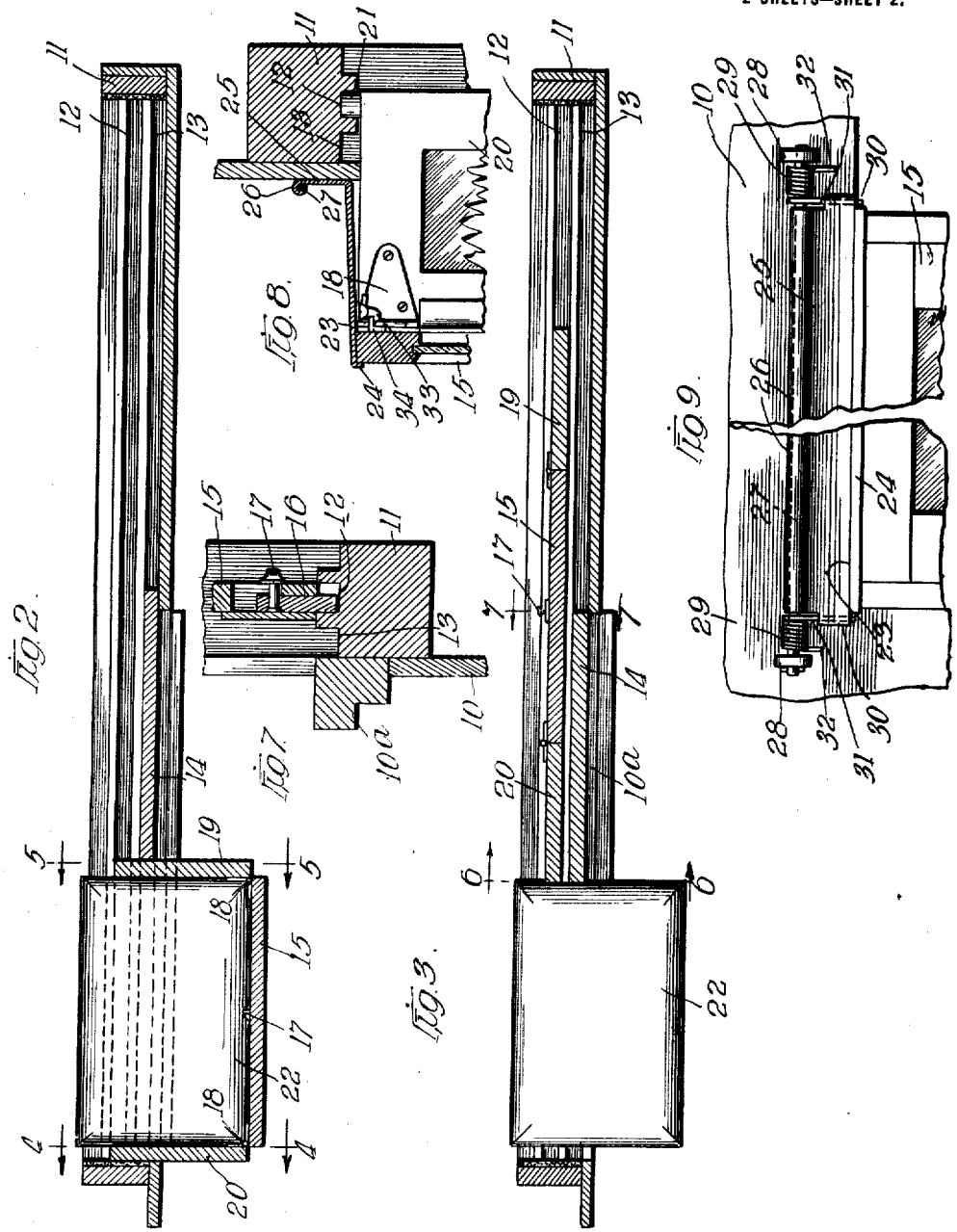

UNITED STATES PATENT OFFICE.

HARRY C. HOGLE, OF CHICAGO, ILLINOIS.

LOCOMOTIVE-CAB WINDOW.

1,348,647.     Specification of Letters Patent.     Patented Aug. 3, 1920.

Application filed June 4, 1918. Serial No. 238,164.

*To all whom it may concern:*

Be it known that I, HARRY C. HOGLE, a citizen of the United States, and a resident of Chicago, in the county of Cook and State of Illinois, have invented certain new and useful Improvements in Locomotive - Cab Windows, of which the following is a specification.

This invention relates to the windows of a locomotive cab and has for its object the provision of a window which may operate and function after the manner of the usual standard cab window, but which may, when desired, be adjusted to constitute a vestibule projecting from the side of the cab, whereby the engineman may be wholly inclosed and thus protected when leaning from the cab window during the operation of the locomotive.

It is a further object of the present invention to provide a window of this character which may readily and quickly be drawn into the cab to function as a standard cab window should the occasion arise.

With the above and other objects in view, as will be apparent, this invention consists of the construction, combination and arrangement of parts, all as hereinafter more fully described, claimed and illustrated in the accompanying drawings, wherein—

Figure 1 is a side elevation of the cab of a locomotive illustrating the present invention in conjunction therewith operating as a projecting vestibule.

Fig. 2 is a longitudinal horizontal section taken along line 2—2 of Fig. 1.

Fig. 3 is a view similar to Fig. 2 illustrating the window constituting the subject matter of the present invention functioning as the usual and standard cab window.

Fig. 4 is a vertical section taken along line 4—4 of Fig. 2.

Fig. 5 is a similar view taken along line 5—5 of Fig. 2 for the purpose of illustrating the forward glass of the vestibule, whereby the engineer may have a clear vision in the case of storm, etc.

Fig. 6 is a vertical section taken along line 6—6 of Fig. 3 illustrating in section the relative positions of the parts when the present window operates after the manner of a standard cab window.

Fig. 7 is a vertical section taken along line 7—7 of Fig. 3.

Fig. 8 is a vertical section taken along line 8—8 of Fig. 1 to illustrate the roof of the vestibule created by the present invention and a means for maintaining the same in its operative position, and Fig. 9 is an enlarged fragmentary side elevation of the vestibule illustrating the details of the roof and a means whereby the same is elevated when not functioning as the roof of said vestibule.

In the standard locomotive the window frames of the cab are provided at the top and bottom thereof with double guideways whereby two windows, one in each guideway, can reciprocate in the frame and are free to pass one another. This is for the purpose of making it possible to open both windows by sliding them toward the front of the cab and position them one by the side of the other, thus creating a large opening. The present invention is designed to take the place of one of these two windows and coöperate with the remaining window somewhat after the manner of the standard window now used, except that it may be further utilized to create a vestibule projecting from the side of the cab which will constitute an inclosure on all sides for the engineer when he is leaning from the cab window, as is necessary during the operation of the locomotive.

Reference being had more particularly to the drawings, 10 designates a standard cab of a locomotive provided with the window opening 10ª which has upon each horizontal side thereof the inner guideway 12 and the outer guideway 13, said guideways extending parallel one to the other. In a standard cab the inner guideways 12 have a solid, rigid window sash reciprocating therein, as does also the outer guideways 13. The present invention maintains the usual standard window sash 14 in the outer guideways 13, while the inner guideways 12 are provided with the window which constitutes the subject matter of the present invention. This window comprises a central sash 15 constructed and formed somewhat after the manner of the standard window sash 14, and of approximately the same size and shape. This central sash 15 however, does not have any direct operative connection with the guideways 12 except the means illustrated in Fig. 7, which is utilized only when the present invention is functioning after the manner of a standard cab window. This means illustrated in Fig. 7 comprises a latch 16 controlled by the handle 17 and is adapted to project outwardly from the lower longitudinal side of the window sash 15 to engage the lower inner guideway 12 in order to maintain the central sash 15 in a fixed position relative to said guideway 12 and prevent any lateral movement thereof during the operation of the present invention as a standard cab window. When this latch 16 is elevated by means of the handle 17 the central sash 15 is free to move laterally with respect to both the guideways 12 and 13, as will be hereinafter apparent.

Pivoted to each end of the central sash 15 by means of the standard hinges 18 is a forward end sash 19 and a rear end sash 20. These end sashes 19 and 20 are relatively narrower than the central sash 15 and are, like the central sash 15, free to swing laterally of the guideways 12 and 13 except in so far as they are anchored at their free ends to said guideways. This anchoring is accomplished by means of the roller bearings 21 projecting vertically from the ends of the end sashes 19 and 20, the roller bearings of each end sash being alined vertically one with the other. Thus the free ends or edges of the end sashes 19 and 20, opposed to the hinges 18 are slidably anchored in the inner guides 12. Manifestly, therefore, when the latch 16 of the central sash 15 engages the guideway 12, the sashes 15, 19 and 20 will be alined longitudinally of said guideways, and will be held against any lateral movement relative to the guideways, thus creating a window which operates and functions as a standard cab window.

However, by alining the window created by the sashes 15, 19 and 20 with the window opening, releasing the latch 16 from guideway 12 and by exerting a pressure on the central sash 15 the latter may be moved laterally to the guideways and assume a position on the exterior of the cab and parallel thereto. This movement of the central sash 15 swings the end sashes 19 and 20 about the roller bearings 21 as pivots and causes them to assume positions at right angles to the central sash 15 by means of the provision of the hinges 18. In this manner a vestibule is created projecting from the side of the cab 10. The bottom of this vestibule is created by the arm rest 22 which is pivoted to the interior edge of the bottom of the window opening 10ª, and assumes either a vertical or horizontal position. This arm rest or pad is provided in practically all standard cabs and is a part thereof. The window or the central sash 15 is equal in width to the length of this arm pad 22, and the width of the end sashes 19 and 20 is such that when the sashes 15, 19 and 20 are positioned to create a vestibule, the outer edge of said pad will rest flush against the central sash 15. Therefore, when the parts are positioned as illustrated in Figs. 2 and 4, the arm rest 22 will completely occupy the space within the bottom of the vestibule so created by the window sashes 15, 19 and 20, thereby forming the bottom of said vestibule.

The top or roof of the vestibule created by the window sashes 15, 19 and 20 constitutes a metal plate 23 approximately equal in width to the portions of the end sashes 19 and 20 projecting from the cab combined with the thickness of the sash 15, and is equal in length to the width of the central sash 15. Along the outer longitudinal edge of this plate 23 is a lip 24 which engages over the upper edge of the central sash 15, as is apparent from Figs. 4, 5 and 8. A transverse flange 25 is provided along the inner longitudinal edge of the plate 23 and terminates in a sleeve 26, by means of which the plate 23 is pivoted to the exterior of the cab adjacent to the upper longitudinal side of the window opening 10ª thereof. A hinge rod 27, carried on the exterior of the cab 10 by means of the brackets 28, is embraced by this sleeve 26 and pivotally secures the plate 23 to the exterior of the cab.

It will be obvious that when the window constituting the subject matter of the present invention is functioning as a standard cab window, it would be undesirable for the plate 23 which constitutes the roof or top of the vestibule, when the window so functions, to project laterally from the side of the cab, and to obviate this means are provided for elevating the plate 23 to occupy the position illustrated in Fig. 6. This is accomplished by means of the coil springs 29 encircling the hinge rod 27 between the terminals of the sleeve 26 and the brackets 28 supporting said rod. The ends of the plate 23 are provided with the extensions 30 under which the outer ends of the coil springs 29 rest. The inner ends 32 of the coil springs 29 rest flush against the outer wall of the cab 10. Thus, when the outer longitudinal edge of the plate 23 is free and unsecured, the springs 29 automatically raise the plate 23 to occupy the position illustrated in Fig. 6.

Upon positioning the central sash 15 and the end sashes 19 and 20 of the present invention to constitute a vestibule, the arm rest 22 is swung from the vertical dotted line position (Fig. 5) to the horizontal dotted line position (Fig. 5), thus constituting the bottom of the vestibule while the plate 23 is lowered to rest upon the upper edge of the central sash 15. It then becomes necessary to secure the outer edge of the plate 23 to the central sash 15 to prevent the springs 29 from acting to raise the same, and for this purpose a catch 33 is pivoted to the inner surface of the plate 23 at a point removed from the lip 24. This catch 33 cooperates with and engages an L-plate 34 secured to the inner face of the central sash 15. The vestibule thus completed permits the engineer to rest upon the arm rest 22 and lean from the cab without exposing himself to the weather. In order, however, to permit him to have a clear vision, the glass of the forward sash 19 is split centrally of its length as at 35, the upper section being hinged and held by means of the wing nut and bolt 36. In case of rain, sleet or snow, the thumb screw 36 may be loosened and the lower end of the hinged section 37 of the glass of the forward end sash 19 forced inwardly or outwardly as desired in order that the engineer may have a direct vision without being impaired by a clouded glass.

The usual standard window 14 operating in the guideways 13 is positioned against the forward end sash 19 of the window constituting the present invention, as illustrated in Fig. 2, so that practically all drafts through the window openings are eliminated.

When it is desired for any reason to withdraw the vestibule and to have the window forming the subject matter of the present invention function after the manner of the usual standard cab window, the standard window 14 is removed from its position where it rests against the forward end sash 19, the arm rest 22 is elevated to the vertical position in full lines (Fig. 6), the catch 33 released so that the plate 23 is elevated, and the central sash pulled toward the cab, at the same time swinging the forward end sash 19 toward the forward end of the cab. This instantaneously alines the sashes 15, 19 and 20 and when the latch 16 engages the guideways 12 the entire structure constituting the three sashes 15, 19 and 20 may be moved toward the forward end of the cab and the arm rest 22 returned to its horizontal position.

What is claimed is:

1. An interchangeable sashed vestibule and sliding sash construction, comprising in combination a window frame inclosing an opening providing tracks extending across and beyond said opening, a series of sashes, the terminal ones of the series having pivotal sliding relation to said tracks, and pivotally supporting an intermediate sash or sashes whereby the series may be brought into a single plane to slide across or from the opening, and the pivoting of the terminal sashes may project the intermediate sash or sashes through the opening and parallel therewith to constitute a vestibule.

2. The combination with the structure recited in claim 1, of the addition of a sliding panel adapted to close the portion of the opening uncovered by the series of sashes when the latter are associated to form a vestibule.

3. The combination with a window frame and a multiple section sash, of means slidably mounting said sash in said frame so that the sections thereof may assume a single plane, and slide in said frame as a single continuous sash, the mounting means permitting said sections to be moved laterally with respect to said frame to create a projecting vestibule.

4. The combination with a window frame and a multiple section sash, of means for slidably mounting said sash in said frame so that the sections thereof may assume a single plane and slide in and from said frame as a single continuous sash, or may be projected from such plane in a manner to form a projecting vestibule, a cover for said vestibule adapted to rest upon the upper edges of said sections when they project to create a vestibule, and means for automatically elevating said cover.

5. The combination with a window frame and a multiple section sash, of means for slidably mounting said sash in said frame so that the sections thereof may assume a single plane and slide in and from said frame as a single continuous sash, or may be projected from such plane in a manner to create a projecting vestibule, a cover adapted to rest upon the upper edges of the sections when the latter operate as a vestibule, and spring means for automatically elevating said cover from coöperation with the sections aforesaid.

6. The combination with a window frame and a multiple section sash, of means for slidably mounting said sash in said frame so that the sections thereof may assume a single plane and slide in and from said frame as a single continuous sash, or may be projected from such plane in a manner to create a projecting vestibule, a cover adapted to rest upon the upper edges of the sections when the latter operate as a vestibule, means for locking the cover against the upper edges of said sections, and means for automatically shifting the cover from projected position when released from engagement as aforesaid.

HARRY C. HOGLE.